United States Patent

Ingemarsson

(10) Patent No.: US 6,719,325 B2
(45) Date of Patent: Apr. 13, 2004

(54) SAFETY ARRANGEMENT FOR A MOTOR VEHICLE

(75) Inventor: Anders Ingemarsson, Kungsbacka (SE)

(73) Assignee: Autoliv Development AB, Vørgørda (SE)

( * ) Notice: Subject to any disclaimer, the term of this patent is extended or adjusted under 35 U.S.C. 154(b) by 82 days.

(21) Appl. No.: 10/080,519

(22) Filed: Feb. 25, 2002

(65) Prior Publication Data

US 2002/0117837 A1 Aug. 29, 2002

(30) Foreign Application Priority Data

Feb. 23, 2001 (GB) ............................................ 0104508

(51) Int. Cl.$^7$ ............................................... B60R 21/32
(52) U.S. Cl. ...................................... 280/735; 180/273
(58) Field of Search .......................... 280/735; 180/268, 180/273; 701/45; 340/667, 436

(56) References Cited

U.S. PATENT DOCUMENTS

| | | | | |
|---|---|---|---|---|
| 5,454,591 A | * | 10/1995 | Mazur et al. | ................ 280/735 |
| 5,626,359 A | * | 5/1997 | Steffens et al. | ............. 280/735 |
| 5,636,864 A | * | 6/1997 | Hori | ............................ 280/735 |
| 5,785,347 A | | 7/1998 | Adolph et al. | |
| 5,831,342 A | * | 11/1998 | Vivacqua et al. | .......... 307/10.1 |
| 5,906,393 A | | 5/1999 | Mazur et al. | |
| 6,043,736 A | | 3/2000 | Sawahata et al. | |
| 6,099,032 A | * | 8/2000 | Cuddihy et al. | ............. 280/735 |
| 6,168,197 B1 | * | 1/2001 | Paganini et al. | ............. 280/735 |
| 6,186,538 B1 | * | 2/2001 | Hamada et al. | ............. 280/735 |
| 6,341,252 B1 | * | 1/2002 | Foo et al. | ...................... 701/45 |

FOREIGN PATENT DOCUMENTS

| | | | |
|---|---|---|---|
| DE | 44 17 064 | 7/1995 | |
| GB | 2 343 043 | 4/2000 | |
| GB | 2 343 977 | 5/2000 | |
| GB | 2 357361 | 6/2001 | |
| JP | 2002019569 A | * 1/2002 | ........... B60R/21/32 |

* cited by examiner

*Primary Examiner*—David R. Dunn
(74) *Attorney, Agent, or Firm*—Venable LLP; Robert Kinberg

(57) ABSTRACT

A motor vehicle has a seat (1) and a dashboard (8) mounted airbag (9) which has a first mode of operation and a less aggressive second mode of operation. There is a seat-belt (6) having a retractor (7) which can enter the automatic locking mode (ALR) in which the reactor will wind in but not pay out. A weight sensing arrangement (4, 5) determines the weight on the seat. If the weight is less that a threshold (MI) and the ALR mode is activated an airbag control (17) makes the airbag inflate, in an accident, with the second less aggressive mode. If the weight exceeds the threshold, then the airbag inflates in the ordinary way. If a child seat is mounted on the seat the seat-belt will be in the ALR mode and the weight will be less than the selected threshold, so that the airbag will not injure an occupant of a child seat.

7 Claims, 1 Drawing Sheet

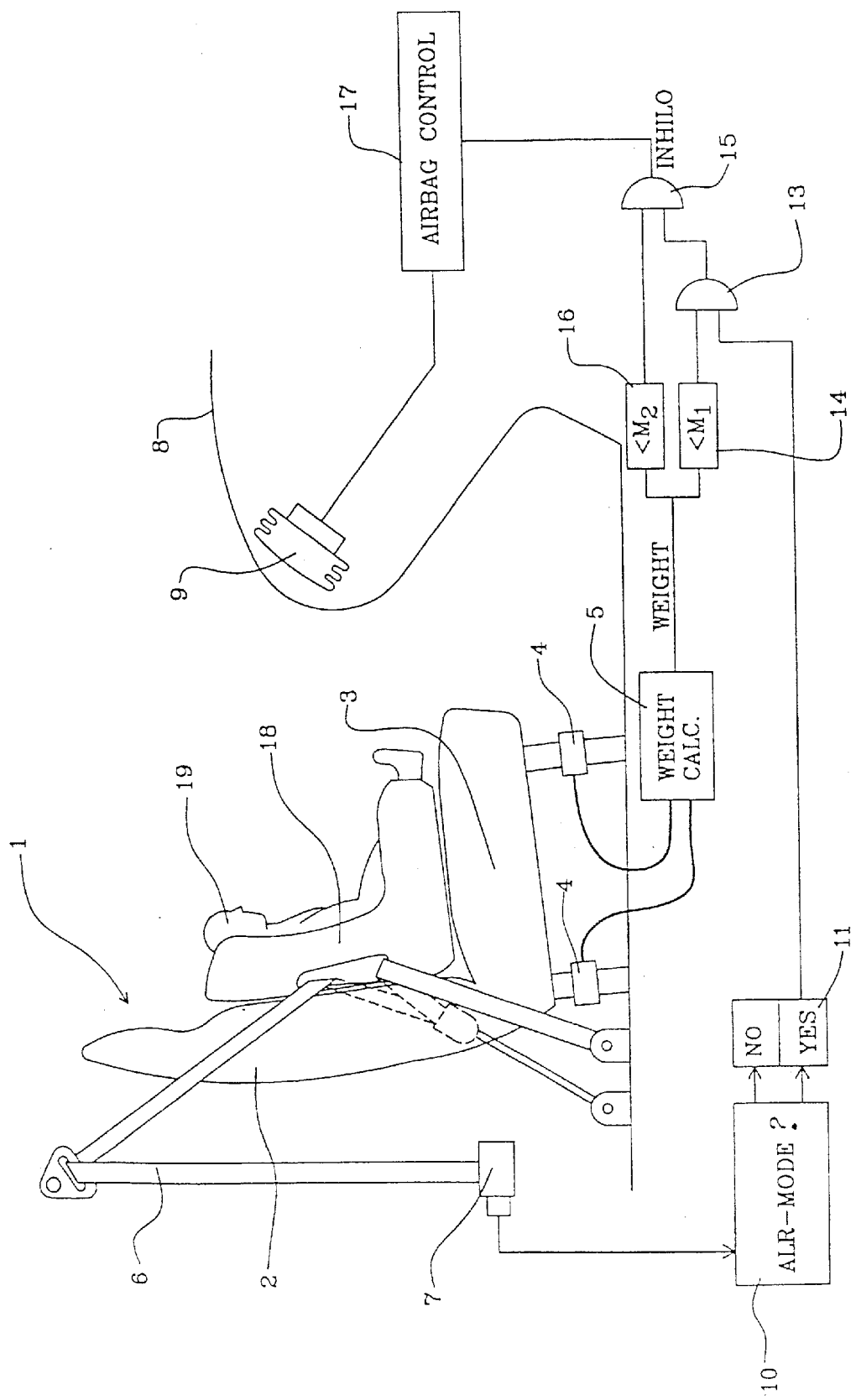

SAFETY ARRANGEMENT FOR A MOTOR VEHICLE

CROSS REFERENCE TO RELATED APPLICATION

This application claims the priority of British Application No. 0104508.7 filed Feb. 23, 2001, the disclosure of which is being incorporated herein by reference.

BACKGROUND OF THE INVENTION

The present invention relates to a safety arrangement for a motor vehicle, and more particularly relates to a safety arrangement provided in association with a seat in the vehicle, which seat has an airbag mounted in front of it to provide protection for the occupant of the seat, and which seat may have a child safety seat mounted on it.

A large proportion of motor vehicles, such as motor cars, are provided with airbags to protect the occupants of the vehicle in the event that an accident should arise. For the front seat of a vehicle it is conventional to mount an airbag in the dashboard of the vehicle so that the airbag, when inflated in response to a sensed accident situation, is located in front of the occupant of the seat.

If a child seat is mounted on the front seat inflation of the airbag should be inhibited if the child seat is a rear facing child seat, and should, at least, be inflated in a less aggressive mode than normal if the child seat is a front facing child seat. The reason for this is that if the airbag inflates when a rear facing child seat is in position on the vehicle seat the inflating airbag will engage with the backrest of the child seat and will thus move the rear facing child seat towards the rear of the vehicle as the bag inflates. In some cases the occupant of the child seat may be ejected from the child seat by this sudden movement of the seat, and may even be thrown out of the rear window of the vehicle. If the child seat is forward facing the face of the occupant of the child seat will actually be quite close to the dashboard where the airbag is stored. If the airbag emerges from the dashboard in an aggressive manner it may physically strike and injure the occupant of the child seat.

It is quite normal to secure a child seat to an ordinary seat in a motor vehicle using the seat belt that is provided on a retractor mechanism in the vehicle for use by an ordinary occupant of the ordinary seat. A normal retractor which may be termed an ELR (Emergency Locking Retractor), is such that the belt can be freely withdrawn from and wound back onto the spool of the retractor unless an emergency situation is detected—for example by detecting a predetermined acceleration of the vehicle or a predetermined speed of withdrawal of the belt from the retractor—in which case the retractor locks to prevent further safety belt being paid out. However, many retractors today are provided with a second mode of operation—the so-called ALR or Automatic Locking Retractor mode.

A retractor which has the ALR mode may operate in the same way as an ELR retractor until almost all of the belt has been paid out, and then the mode of operation will change so that, once the belt has been positioned, belt is blocked from being pulled out from the retractor, but may be pulled back into the retractor. Some forms of ALR retractor may be provided with a manually controllable switch to change the retractor from ELR mode to ALR mode. When a safety belt is used to mount a child seat in position, especially a rear facing child seat, virtually all of the belt should be withdrawn from the spool of the retractor so that if the appropriate type of ALR retractor is used the retractor enters the automatic locking mode. Thus, once the belt that secures the child in position has been located in the desired condition the retractor effectively locks to prevent further belt being withdrawn. Alternatively, the retractor may be manually switched to the ALR mode when the child seat has been mounted in position. It may be appropriate to manually switch to the ALR mode when mounting a forward facing child seat in position It has been proposed (see DE-A-44 17 064) to use a control signal taken from an ALR retractor of a vehicle seat when it is in the automatic locking mode to inhibit or control the mode of operation of the airbag associated with the seat. Thus, when a child seat is mounted on the vehicle seat and the seat-belt is pulled almost fully out of the retractor, in an accident situation the airbag will not inflate, or will not fully inflate, thus reducing the risk that the airbag itself will cause injuries to the occupant of the child seat.

However, if an adult uses the seat which is provided with the airbag arrangement of DE-A-44 17 064 who is so large that the safety belt is pulled out of the retractor far enough to make the retractor enter the automatic locking mode, or if the retractor should be in the ALR mode for some other reason, then the mode of operation of the airbag will be controlled so that in an accident situation the airbag will not inflate, or will not fully inflate. This is very undesirable as the airbag will then not provide adequate protection for the occupant of the seat.

SUMMARY OF THE INVENTION

The present invention seeks to provide an improved safety arrangement.

According to this invention there is provided a safety arrangement for a motor vehicle, the arrangement including a seat for an occupant of the vehicle, an airbag, adapted to be inflated in an accident situation to provide protection for the occupant of the seat, the airbag having a first mode of operation and a second, less aggressive mode of operation, a safety-belt for use by the occupant of the seat, the safety-belt being provided with a retractor interchangeable between an ELR mode of operation and an ALR mode of operation, there being first means for determining whether the retractor is in the ALR mode, and second means for determining whether the down-force on the seat is less than a first threshold, which first and second means are associated with means which control the mode of deployment of the airbag during an accident situation, so that if the retractor is in the ALR mode of operation and if the down-force on the seat is less than the first threshold, the airbag is deployed in the second, less aggressive, mode of operation.

In one embodiment, in the second mode of operation, the airbag is not inflated at all. In an alternative embodiment, in the second mode of operation the airbag is only partially inflated, as compared with the first mode of operation. In the second mode of operation, the airbag is inflated relatively slowly, as compared with the first mode of operation.

In one embodiment the first threshold is approximately 60 kg.

Conveniently means are provided for determining if the down-force on the seat is lower than a second threshold, which is lower than the first threshold, and to cause the means which control the mode of deployment of the airbag to cause the airbag to be deployed in the second, less aggressive mode of operation if the down-force on the seat is less than said second threshold.

Preferably the second threshold is approximately 35 kg.

In one embodiment an output from the first means which determine whether the retractor is in the ALR mode, and the output of the second means that determine whether the down-force on the seat is less than a first threshold are passed to an AND gate, the output of which is passed to an OR gate, a second input to the OR gate being the output of the means for determining if the down-force on the seat is lower than the second threshold, the output of the OR gate being supplied to the means which control the mode of deployment of the airbag.

The first and the second thresholds may be predetermined thresholds, but in some embodiments the thresholds may be variable.

BRIEF DESCRIPTION OF THE DRAWINGS

In order that the invention may be more readily understood, and so that further features thereof may be appreciated, the invention will now be described, by way of example, with reference to the accompanying drawing.

FIG. 1 is a schematic illustration, and partly block diagram of an embodiment of this invention.

DETAILED DESCRIPTION OF THE INVENTION

A vehicle which incorporates a safety system in accordance with the invention is provided with a conventional seat 1 having a backrest 2 and a squab 3. The seat is mounted on the floor of the vehicle by means of weight sensing elements 4. These elements may be piezo resistive elements, such as strain gauges, although any elements capable of providing an output signal representative of the total weight of the seat and the occupant of the seat (or representative of the weight of the seat and any down-force applied to the seat) may be used. The weight sensing elements are connected to a weight calculating device 5 adapted to calculate the weight of the occupant of the seat, or the magnitude of any down-force applied to the seat.

The seat 1 is provided with a three-point safety belt 6 of a conventional design which includes a floor mounted retractor reel 7 which is an ALR retractor which enters the automatic locking mode at least when a predetermined length of safety belt has been withdrawn from the retractor 7, or which can be manually adjusted to be in the ALR mode.

The illustrated seat 1 is a front seat of the vehicle and is thus located with the dashboard 8 of the vehicle just in front of the seat. An airbag 9, with an associated inflator, is mounted within the dashboard.

The retractor 7 is provided with a sensor 10 adapted to sense when the retractor is in the automatic locking mode, and a logic device 11 to provide an output signal when the automatic locking mode is sensed. The output signal is supplied to one input of an AND gate 13, the other input of which is supplied by the output of a weight discriminator 14 which receives a signal from the weight calculating device 5 and which provides an output if the sensed weight or down-force is below a predetermined limit M1, such as 60 kg, which represents the maximum download caused by the combination of the child seat, the child, and the down-force provided by the safety belt. The output of the AND gate 13 is connected as one input of an OR gate 15, the second input of which is connected to the output of a second discriminator 16 which also has an input connected to the output of the weight calculating device 5 and which provides an output if the sensed weight is below a predetermined limit M2, which is less than M1, and which may thus be 35 kg, which represents the maximum weight of the child seat and the child. The output of the OR gate 16 is passed to a control unit 17 which controls the deployment of the airbag 9.

The airbag 9 will have an ordinary mode of operation in which the airbag is deployed, in an accident situation, to protect an ordinary occupant of the seat, The airbag will also have a modified, less aggressive, mode of operation in which the airbag will only be partially inflated as compared with the ordinary mode, or will be inflated with a slower inflation rate than in the ordinary mode, or in which the airbag will not be inflated at all.

If the retractor 7 is in the ALR mode and if the down-force on the seat 1 is less than M1, which in this example is 60 kg, the airbag will only have the modified mode of operation. These conditions will exist when a child seat, such as the child seat 18, containing a child, 19, is in position on the seat 1, since the retractor will be in the ALR mode either because of the length of safety belt that has been withdrawn, or because the retractor has been switched to be in that mode, and the weight of the seat and the child will be less than 35 kg, and the additional down-force applied to the child seat by the action of the safety-belt 6 and the associated retractor will be up to 25 kg. Thus, with a child seat in position on the seat the airbag will, in an accident, only have the modified mode of operation.

If a child seat is mounted on the seat 1, and for some reason the retractor is not in the ALR mode, provided that the sensed weight is less than M2, in the example given 35 kg, then again the airbag will, in an accident situation, only have the modified operation, since the output of the OR gate 16 will cause the airbag control 17 to modify the operation of the airbag in this way.

A typical adult person has a weight in excess of 60 kg, and a large adult has an even greater weight. If an adult having a weight in excess of M1, in this example 60 kg, is sitting on the seat, and for some reason the retractor is in the ALR mode, then the airbag 9 will, in an accident situation, be deployed with the ordinary mode of operation. If a small adult person, who might have a weight between 35 and 60 kg is sitting on the seat, they would probably not activate the ALR mode by accident, and thus the airbag would still, in an accident situation, be deployed in the ordinary mode. Thus by sensing whether the retractor is in the ALR mode of operation, and also sensing the weight or down-force applied to the seat, the deployment of the airbag, in an accident situation, can be controlled so that the airbag is deployed appropriately having regard to the nature of the occupant of the seat. It would not be appropriate simply to sense the weight of the occupant to determine the mode of operation of the airbag, as the total download provided by a child, in a child seat, that is tightly strapped down, which may be a load of up to 60 kg, which is equivalent to the weight of a small adult. In the example given if anyone sits on the seat who has a weight of at least 35 kg, and up to 60 kg sits on the seat without the ALR activated, or if anyone over the weight of 60 kg sits on the seat, regardless of whether the ALR is activated or not, then the airbag will, in an accident situation be deployed with the ordinary mode of operation.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A safety arrangement for a motor vehicle, the arrangement including a seat for an occupant of the vehicle, an airbag, adapted to be inflated in an accident situation to provide protection for the occupant of the seat, the airbag having a first mode of operation and a second, less aggressive mode of operation, a safety-belt for use by the occupant of the seat, the safety-belt being provided with a refractor interchangeable between an ELR mode of operation and an ALR mode of operation, there being first means for determining whether the retractor is in the ALR mode, and second means for determining whether the down-force on the seat is less than a first threshold, which first and second means are associated with means which control the mode of operation of the airbag during an accident situation, so that if the retractor is in the ALR mode of operation and if the down-force on the seat is less than the first threshold, the airbag is deployed in the second, less aggressive, mode of operation, and if the down-force is not less than the first threshold, the airbag is deployed in the first mode of operation.

2. An arrangement according to claim 1 wherein, in the second mode of operation the airbag is only partially inflated, as compared with the first mode of operation.

3. An arrangement according to claim 1 wherein, in the second mode of operation, the airbag is inflated relatively slowly, as compared with the first mode of operation.

4. An arrangement according to claim 1 wherein the first predetermined threshold is approximately 60 kg.

5. An arrangement according to claim 4 wherein means are provided for determining if the down-force on the seat is lower than a second threshold, which is lower than the first threshold, and to cause the means which control the mode of deployment of the airbag to cause the airbag to be deployed in the second, less aggressive mode of operation if the down-force on the seat is less than said second threshold.

6. An arrangement according to claim 5 wherein said second threshold is approximately 35 kg.

7. An arrangement according to claim 5 wherein an output from the first means which determine whether the retractor is in the ALR mode, and the output of the second means that determine whether the down-force on the seat is less than a first threshold are passed to an AND gate, the output of which is passed to an OR gate, a second input to the OR gate being the output of the means for determining if the down-force on the seat is lower than the second threshold, the output of the OR gate being supplied to the means which control the mode of deployment of the airbag.

* * * * *